United States Patent [19]
Kawabata et al.

[11] Patent Number: 5,241,436
[45] Date of Patent: Aug. 31, 1993

[54] MAGNETIC DISC DRIVE APPARATUS

[75] Inventors: Tomoki Kawabata; Toru Tanaka; Hitoshi Taniguchi, all of Kanagawa, Japan

[73] Assignee: Sony Corporation, Tokyo, Japan

[21] Appl. No.: 924,406

[22] Filed: Aug. 3, 1992

Related U.S. Application Data

[63] Continuation of Ser. No. 641,670, Jan. 15, 1991, abandoned.

[30] Foreign Application Priority Data

Jan. 18, 1990 [JP] Japan .................................. 2-9099

[51] Int. Cl.⁵ .............................................. G11B 5/012
[52] U.S. Cl. ................................. 360/97.01; 360/137
[58] Field of Search ............. 360/97.01, 137, 105–106, 360/78.04

[56] References Cited

U.S. PATENT DOCUMENTS

| | | | |
|---|---|---|---|
| 4,639,863 | 1/1987 | Harrison et al. | 364/200 |
| 4,965,684 | 10/1990 | Stefansky | 360/105 X |
| 5,025,335 | 6/1991 | Stefansky | 360/137 X |

Primary Examiner—John H. Wolff
Attorney, Agent, or Firm—Limbach & Limbach

[57] ABSTRACT

A magnetic disc drive apparatus in which a magnetic disc rotating section and a head arm having a magnetic head are accommodated within a casing and a main printed circuit board is attached to a bottom surface side of the casing is comprised of an auxiliary printed circuit board having at least a recording/playback amplifier, a playback side frequency characteristic circuit and a playback side pulse shaping circuit and which is accommodated within the casing, the auxiliary printed circuit board being connected to the magnetic head and the main printed circuit board. Thus, recording/reproducing signals can be prevented from being deteriorated by inside or extraneous noise and space for assembly parts on the main printed circuit board can be saved.

7 Claims, 6 Drawing Sheets

MAGNETIC DISC DRIVE APPARATUS

This is a continuation of co-pending application Ser. No. 07/641,670 filed on Jan. 15, 1991, now abandoned.

BACKGROUND OF THE INVENTION

1. Field of the Invention

The present invention generally relates to magnetic disc drive apparatus and, more particularly, is directed to a magnetic disc drive apparatus suitable for use with, for example, a hard disc recording and reproducing apparatus.

2. Description of the Prior Art

A conventional magnetic disc (hard disc) drive apparatus will be explained hereinafter with reference to FIGS. 1 to 3.

A perspective view forming FIG. 1 shows an overall arrangement of a conventional magnetic disc drive apparatus. In FIG. 1, reference numeral 1 designates a casing of this magnetic disc drive apparatus and assembly parts and so on, which will be explained later, and which are accommodated within this casing 1. A magnetic disc rotating section 2 is a motor (i.e. outer rotor type motor) which rotates a magnetic disc (hard disc) 3.

There is shown a head arm 5 and a magnetic head 4 is mounted on the top thereof. This head arm 5 is rotated about a rotary shaft 6 provided at its opposite end portion by a voice coil motor (not shown).

A flexible printed circuit board 7 is accommodated within the casing 1, and this flexible printed circuit board 7 is operated as a transmission line which connects the magnetic head 4 mounted on the top of the head arm 5 with a recording/playback amplifier 8 mounted on a rigid printed circuit board 11 which will be described later. The above-mentioned assembly parts and so on are accommodated within the casing 1.

The rigid printed circuit board 11 is attached to the outside of the bottom of the casing 1. The recording/playback amplifier 8 is mounted on the rigid printed circuit board 11. As shown in a schematic block diagram forming FIG. 2, upon recording, a record signal from this recording/playback amplifier 8 is supplied through interconnected wires in the printed circuit board 7 to the magnetic head 4, and the record signal is recorded on a recording surface of the magnetic disc 3 (see FIG. 1) by the magnetic head 4. Upon reproduction, a recorded signal recorded on the magnetic disc 3 is reproduced by the magnetic head 4, and the reproduced signal is supplied through interconnected wires of the flexible printed circuit board 7 to the recording/playback amplifier 8.

A playback side frequency characteristic circuit (i.e. equalizer and/or filter) 9 is provided on the rigid printed circuit board 11 and this playback side frequency characteristic circuit 9 is adapted to waveform-equalize and/or filter-out the reproduced signal from the recording/playback amplifier 8.

A playback side pulse shaping circuit 10 is provided on the rigid printed circuit board 11, and this playback side pulse shaping circuit 10 is to pulse-shape the reproduced signal from the playback side frequency characteristic circuit 9 to thereby generate a digital signal (pulse signal). Such digital signal is fed to a reproduced signal processing system and so on which are not shown.

The upper portion of the above-mentioned casing 1 is covered with an upper lid (not shown) and this magnetic disc drive apparatus is incorporated into a computer or the like, wherein the recording and/or reproduction operation thereof can be controlled by a central processing unit (CPU), a controller or the like of the computer.

Another example of the conventional magnetic disc drive apparatus will be described with reference to FIG. 3, in which like parts corresponding to those of the conventional magnetic disc drive apparatus of FIG. 1 are marked with the same references and therefore need not be described in detail In the example of the conventional magnetic disc drive apparatus, as shown in FIG. 3, the area of the flexible printed circuit board 7 accommodated within the casing 1 is increased, and also the recording/playback amplifier 8 is mounted on the flexible printed circuit board 7 unlike the magnetic disc drive apparatus of FIG. 1. According to this magnetic disc drive apparatus, the space of the rigid printed circuit board 11 can be increased by the amount corresponding to the recording/playback amplifier 8 and reproduced signal noise supplied to the circuits of the rigid printed circuit board 11 can be reduced.

In the conventional magnetic disc drive apparatus explained with reference to FIG. 1, the recording/playback amplifier 8, the playback side frequency characteristic circuit 9 and the playback side pulse shaping circuit 10 are mounted on the rigid printed circuit board 11, thus making it difficult to save the space of the rigid printed circuit board 11. Further, the recording/reproducing signals from the magnetic head 4 pass temporarily to the outside through the flexible printed circuit board 7. Further, an analog circuit and a digital circuit are mounted on the rigid printed circuit board 11 in a mixed fashion so that a noise is easily mixed into the recording/reproducing signals.

Since the conventional magnetic disc drive apparatus of FIG. 3 differs from the conventional magnetic disc drive apparatus of FIG. 1 only in that the recording/playback amplifier 8 is mounted on the flexible printed circuit board 7 accommodated within the casing 1, the space of the rigid printed circuit board 11 cannot be saved without difficulty. Also, there is then the substantial risk that the recording/reproducing signals will be deteriorated by inside or extraneous noise.

OBJECTS AND SUMMARY OF THE INVENTION

Accordingly, it is an object of the present invention to provide an improved magnetic disc drive apparatus which can eliminate the aforenoted shortcomings and disadvantages encountered with the prior art.

More specifically, it is an object of the present invention to provide a magnetic disc drive apparatus which can reduce an amount in which recording/reproducing signals are deteriorated by inside or extraneous noise.

It is another object of the present invention to provide a magnetic disc drive apparatus in which space on a main printed circuit board can be saved.

It is a further object of the present invention to provide a magnetic disc drive apparatus in which a printed circuit board thereof can be designed with ease.

According to an aspect of the present invention, a magnetic disc drive apparatus in which a magnetic disc rotating section and a head arm having a magnetic head are accommodated within a casing and a main printed circuit board is attached to a bottom surface side of the casing is comprised of an auxiliary printed circuit board having at least a recording/playback amplifier, a playback side frequency characteristic circuit and a playback side pulse shaping circuit and which is accommodated within the casing, the auxiliary printed circuit board being connected to the magnetic head and the main printed circuit board. Thus, recording/reproducing signals can be prevented from being deteriorated by inside or extraneous noise and space for assembly parts on the main printed circuit board can be saved.

The above, and other objects, features and advantages of the present invention will become apparent from the following detailed description of illustrative embodiments to be taken in conjunction with the accompanying drawings, in which like reference numerals are used to identify the same or similar parts in the several views.

DETAILED DESCRIPTION OF THE PREFERRED EMBODIMENTS

Figure 1:
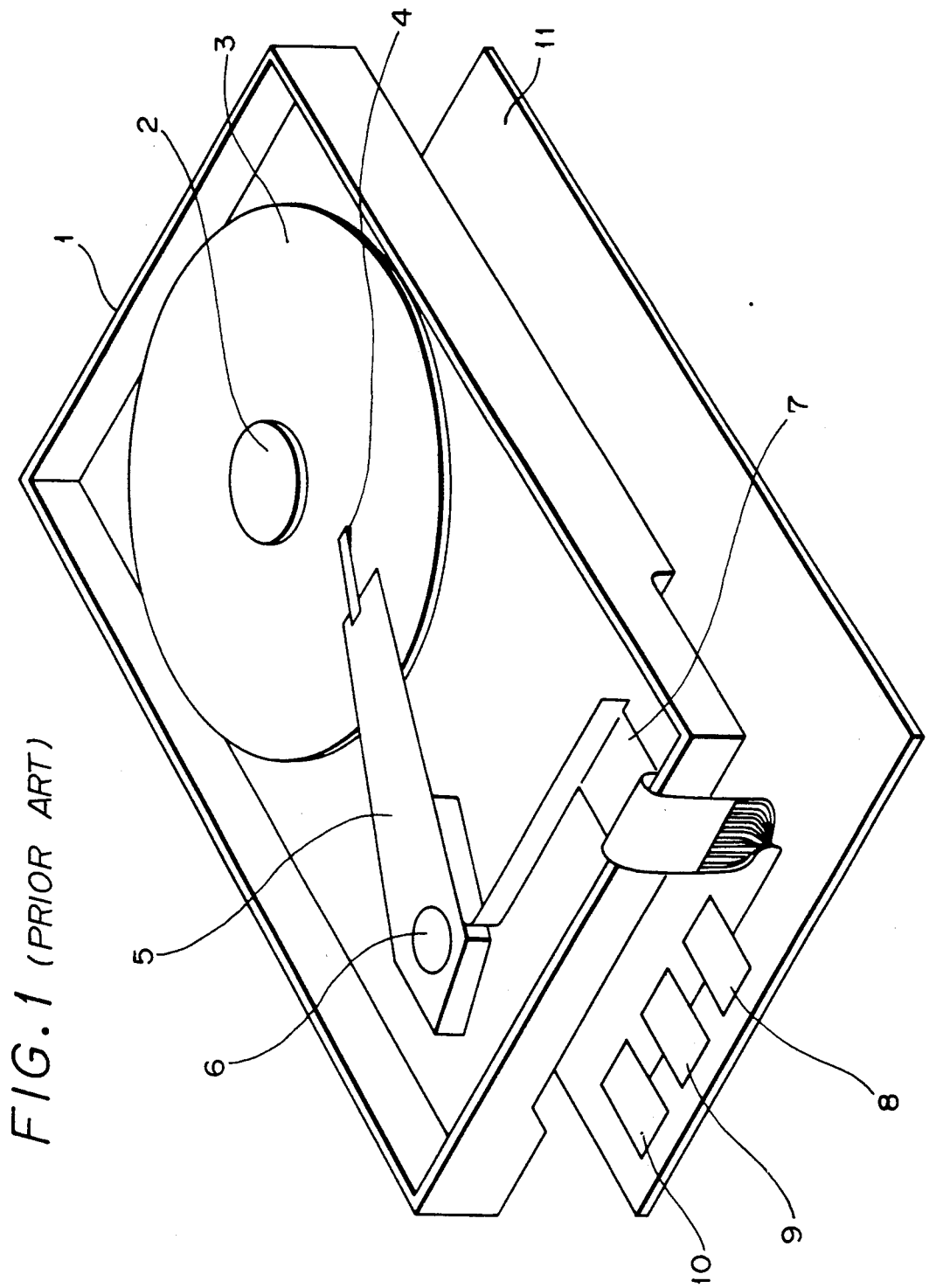
FIG. 1 is a perspective view illustrating an example of a conventional magnetic disc drive apparatus.
Figure 2:
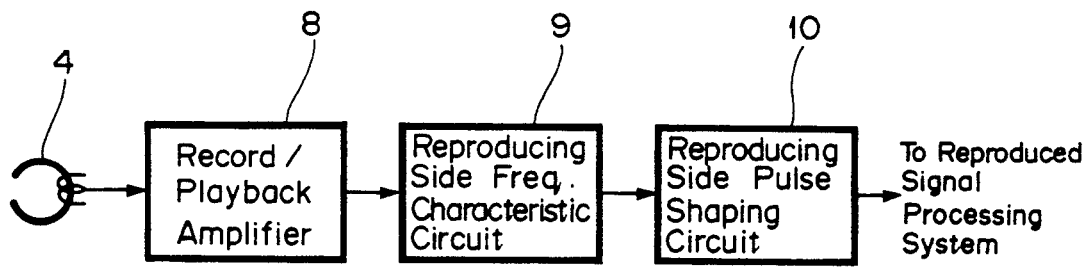
FIG. 2 is a schematic block diagram of an example of reproducing side circuits, and to which references will be made in explaining the conventional magnetic disc drive apparatus.
Figure 3:
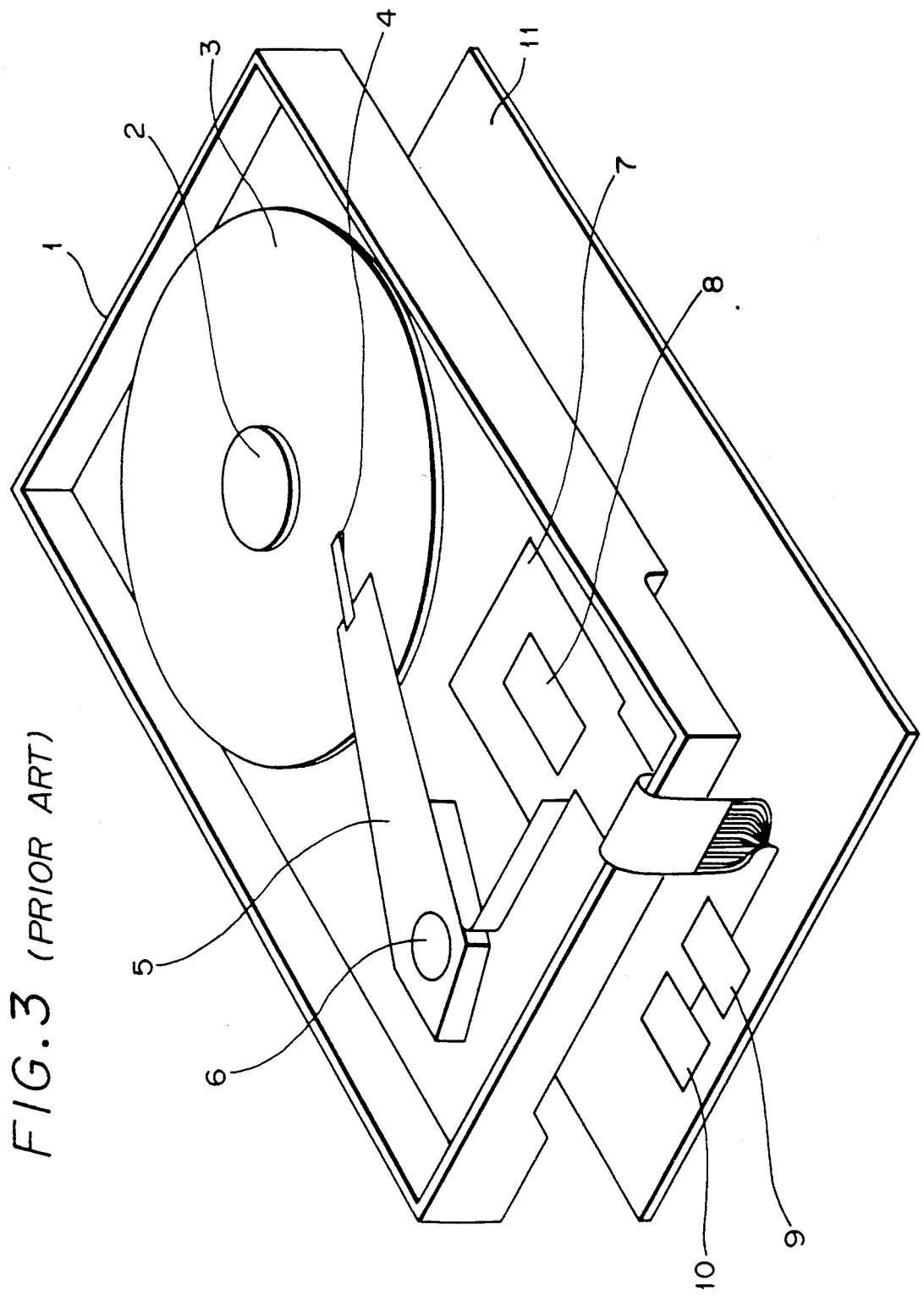
FIG. 3 is a perspective view illustrating another example of a conventional magnetic disc drive apparatus.
Figure 4:
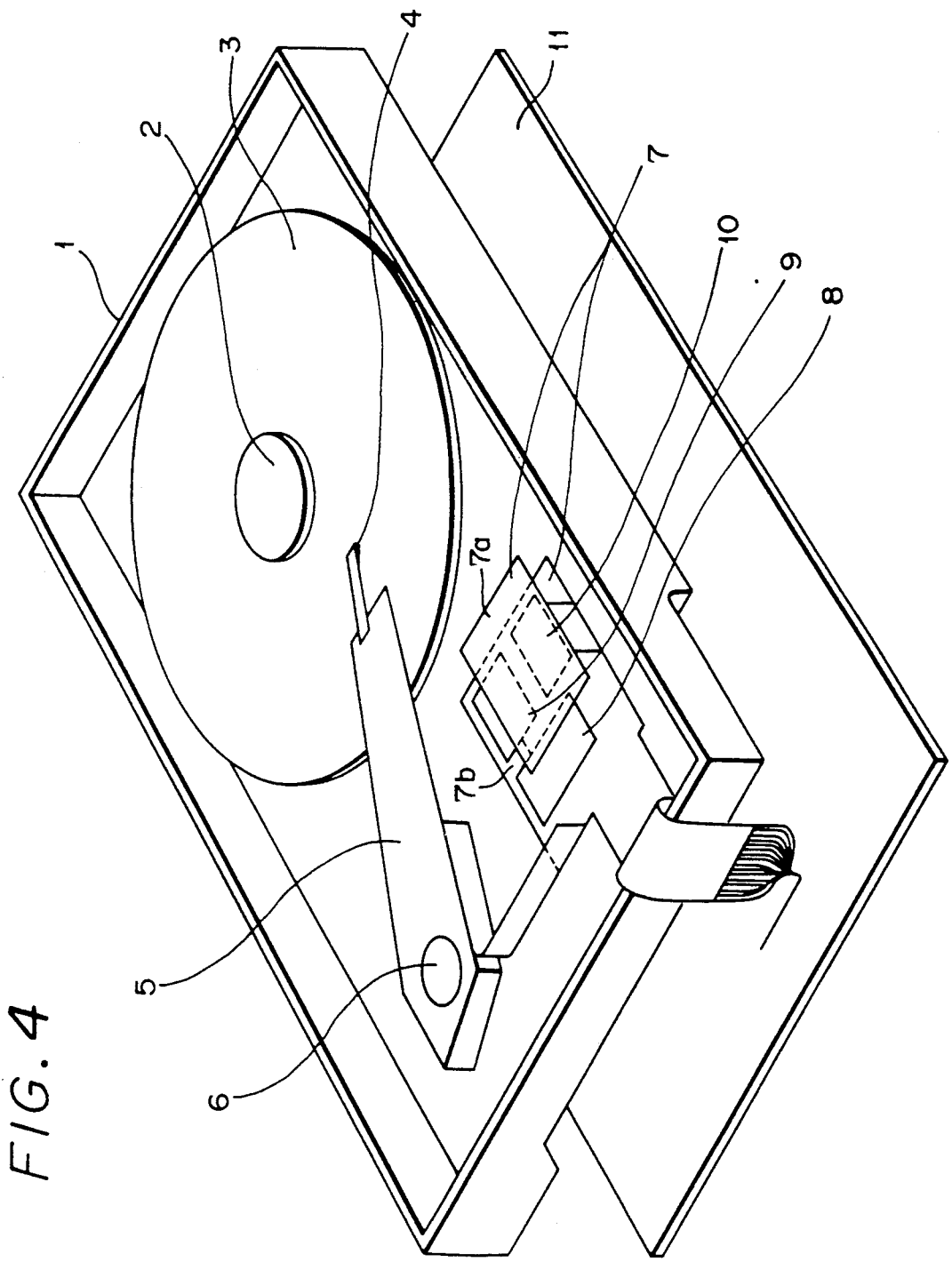
FIG. 4 is a perspective view illustrating a first embodiment of a magnetic disc drive apparatus according to the present invention.

Referring to the drawings in detail, and initially to FIG. 4, a first embodiment of the magnetic disc drive apparatus according to the present invention will be described. In FIG. 4, like parts corresponding to those of the conventional magnetic disc drive apparatus described with reference to FIGS. 1 and 3 are marked with the same reference numerals and therefore need no be described in detail.

Referring to FIG. 4, there is provided the first embodiment of the magnetic disc drive apparatus according to the present invention. While the magnetic disc drive section 2 and the magnetic disc 3 are accommodated within the metal casing 1, the flexible printed circuit board (auxiliary printed circuit board) 7 is mounted on the corner portion of the inside of the metal casing 1. In use, this flexible printed circuit board 7 is bent as substantially U-letter configuration in cross section, wherein the playback side pulse shaping circuit 10 is mounted on the lower surface of an upper side printed circuit board portion 7a of the flexible printed circuit board 7 and the recording/playback amplifier 8 and the playback side frequency characteristic circuit 9 are mounted on the upper surface of a lower side printed circuit board portion 7b of the flexible printed circuit board 7.

A second embodiment of the magnetic disc drive apparatus according the present invention will be explained with reference to FIGS. 5A-5C.

Figure 5A:
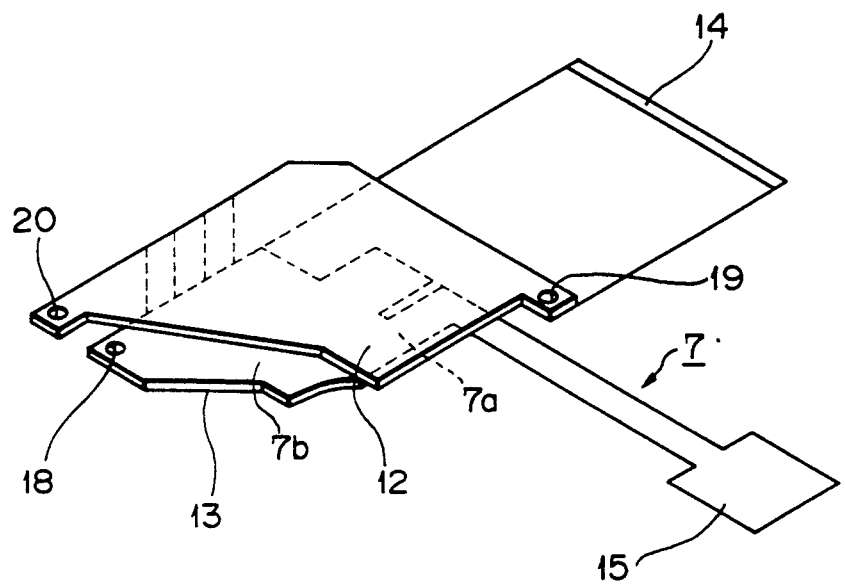
FIGS. 5A, 5B and 5C are respectively a perspective view and plan views illustrating a second embodiment of the magnetic disc drive apparatus according to the present invention.

FIG. 5A shows the flexible printed circuit board 7 bent as substantially U-letter configuration in cross section and which is accommodated within the metal casing 1 in that bent condition similarly to FIG. 4.

Figure 5B:
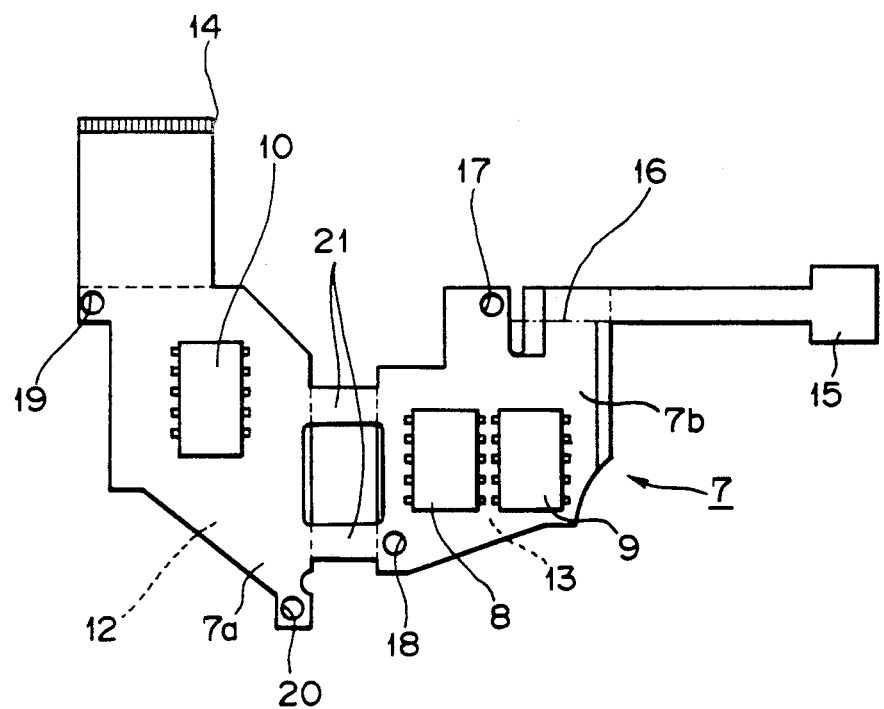
Figure 5C:
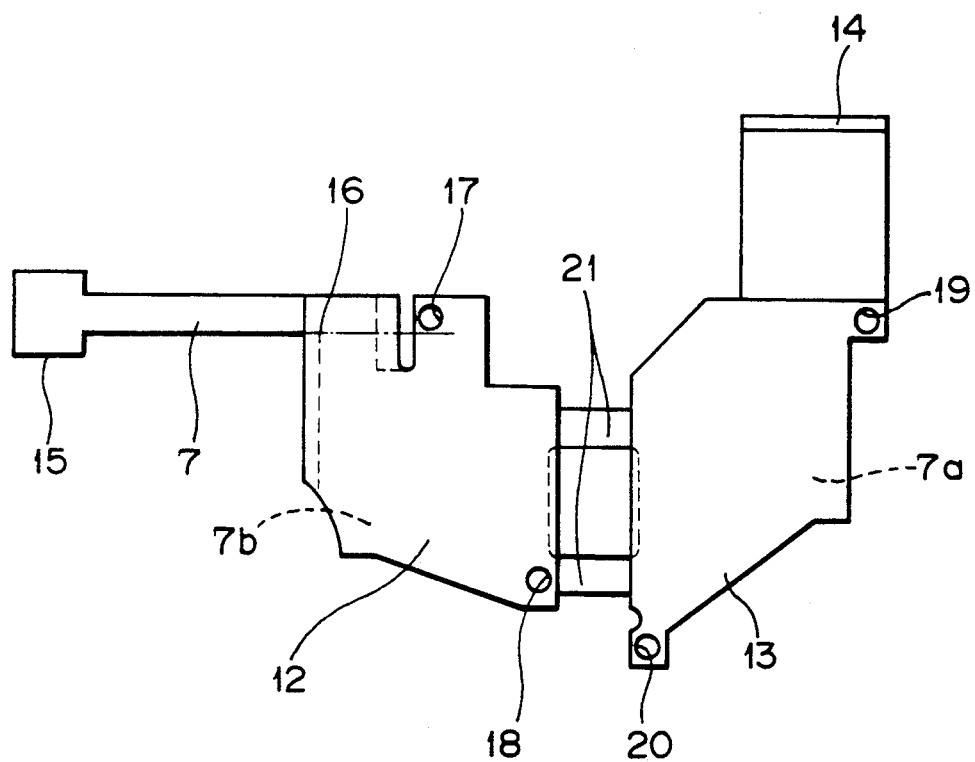

FIGS. 5B and 5C show front and back surfaces of the flexible printed circuit board 7 shaped as flat plate before being accommodated within the metal casing 1, respectively.

Similarly to FIG. 4, this flexible printed circuit board 7 is accommodated within the casing 1 so as to have a cross section of substantially U-letter configuration. More specifically, the upper side printed circuit board portion (left portion of FIG. 5B) 7a and a lower side printed circuit board portion (right portion of FIG. 5B) 7b are coupled together by intermediate connecting portions 21, and the flexible printed circuit board 7 is bent at borders of the respective portions 7a, 7b and 21, thereby being shaped substantially as U-letter configuration. The playback side pulse shaping circuit 10 is mounted on the lower surface of the upper side printed circuit board portion 7a of the flexible printed circuit board 7 while the recording/playback amplifier 8 and the playback side frequency characteristic circuit 9 are mounted on the upper surface of the lower side printed circuit board portion 7b of the flexible printed circuit board 7.

Backing metal plates 12 and 13 are made of aluminum plate of, for example, about 1 mm thick and are respectively bonded to the rear surfaces of the upper side printed circuit board portion 7a and the lower side printed circuit board portion 7b in order to reinforce the flexible printed circuit board 7, to attach the flexible printed circuit board 7 to the casing 1 and to shield the record/playback signals from noises. A rigid printed circuit board connection portion 14 is provided which is to be connected to the rigid printed circuit board 11 (see FIG. 4).

A head connecting portion 15 is provided on a free end of a bent portion 16 that is bent at its portion when connected to the magnetic head 4. Such portion is bent toward the direction perpendicular to the sheet of drawing together with the backing metal plate 13. Positioning apertures 18 and 19 are bored through the flexible printed circuit board 7. When the flexible printed circuit board 7 is accommodated within and attached to the casing 1, guide pins (not shown) provided within the casing 1 at its predetermined positions are inserted into positioning apertures 18 and 19. Further, screw apertures 17 and 20 are bored through the flexible printed circuit board 7 and secured to a screw aperture of an upper lid (not shown) and a screw aperture (not shown) of the bottom of the casing 1 by screws (not shown).

As is clear from the above-mentioned embodiments, since the recording/playback amplifier 8 and the playback side frequency characteristic circuit 9 as analog circuits are mounted on the upper side printed circuit board portion 7a of the flexible printed circuit board 7 and the playback side pulse shaping circuit 10 as a digital circuit is mounted on the lower side printed circuit board portion 7b of the flexible printed circuit board 7, a reproduced signal is converted into a digital signal by the playback side pulse shaping circuit 10 of the flexible printed circuit board 7 and then supplied to the rigid printed circuit board 11 side, the reproduced signal can be prevented from being affected by extraneous noise.

Further, signal interference from the digital circuit to the analog circuit can be avoided and the layout of the assembly parts within the casing 1 need not be changed.

Furthermore, since the recording/playback amplifier 8, the playback side frequency characteristic circuit 9 and the playback side pulse shaping circuit 10 are separated from the rigid printed circuit board 11, signal interference from the rigid printed circuit board 11 to the recording/playback amplifier 8, the playback side frequency characteristic circuit 9 and the playback side pulse shaping circuit 10 provided as the reproducing circuits need not be considered, thus making the design of the printed circuit board easier.

According to the present invention, as set forth above, the magnetic disc drive apparatus is arranged such that the magnetic disc rotating section and the head arm (which has mounted at the top thereof the magnetic head) are accommodated within the casing and the main printed circuit board is attached to the bottom surface side of the casing. In this magnetic disc drive apparatus, since the auxiliary printed circuit board having mounted thereon at least the recording/playback amplifier, the playback side frequency characteristic circuit and the playback side pulse shaping circuit is accommodated within the casing and the auxiliary printed circuit board is connected to the magnetic head and the main printed circuit board, the degree to which the recording/reproducing signals are deteriorated by the inside or extraneous noise can be reduced and the amount of space of assembly parts on the main printed circuit board can be saved.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. A magnetic disc drive apparatus in which a magnetic disc rotating section and a head arm having a magnetic head are accommodated within a casing and a main printed circuit board is attached to a bottom surface side of said casing, comprising:
   a flexible auxiliary printed circuit board having at least a recording/playback amplifier, a playback side frequency characteristic circuit and a playback side pulse shaping circuit and which is accommodated within said casing, wherein the recording/playback amplifier is an analog circuit connected to said magnetic head, the playback side frequency characteristic circuit is an analog circuit connected to the recording/playback amplifier, and the playback side pulse shaping circuit is a digital circuit connected to the main printed circuit board which receives the digitizes an analog reproduced signal from the playback side frequency characteristic circuit to generate a digital signal, and supplies the digital signal to said main printed circuit board, in which said auxiliary printed circuit board is comprised of an upper printed circuit board portion, a lower printed circuit board portion, and a connecting portion.

2. A magnetic disc drive apparatus according to claim 1, in which said auxiliary printed circuit board is bent to be substantially as a U-letter configuration in cross section.

3. A magnetic disc drive apparatus according to claim 1, in which said playback side pulse shaping circuit is mounted on said upper printed circuit board portion.

4. A magnetic disc drive apparatus according to claim 1, in which said recording/playback amplifier and said playback side frequency characteristic circuit are mounted on said lower printed circuit board portion.

5. A magnetic disc drive apparatus in which a magnetic disc rotating section and a head arm having a magnetic head are accommodated within a casing and a main printed circuit board is attached to the bottom surface of said casing, said magnetic disc drive apparatus further comprising:
   a flexible auxiliary printed circuit board shaped to fit within said casing, said auxiliary printed circuit board being shaped so as to be substantially in the form of the letter U in cross-section, thereby forming an upper flexible auxiliary printed circuit board portion, a lower flexible auxiliary printed circuit board portion, and a connecting portion;
   a playback side pulse shaping circuit mounted on an inside surface of said lower flexible auxiliary printed circuit board portion; and
   a recording/playback amplifier and a playback side frequency characteristic circuit mounted on an inside surface of said upper flexible auxiliary printed circuit board portion;
wherein said recording/playback amplifier is an analog circuit connected to said magnetic head, the playback side frequency characteristic circuit is an analog circuit connected to the recording/playback amplifier, and the playback side pulse shaping circuit is a digital circuit connected to the main printed circuit board which receives and digitizes an analog reproduced signal from the playback side frequency characteristic circuit to generate a digital signal, and supplies the digital signal to said main printed circuit board.

6. A magnetic disk drive apparatus according to claim 5 wherein said flexible auxiliary printed circuit board is made of aluminum plate.

7. A magnetic disk drive apparatus according to claim 6 wherein said plate is about 1 mm thick.

* * * * *